(12) United States Patent
Amaya et al.

(10) Patent No.: US 9,902,030 B2
(45) Date of Patent: Feb. 27, 2018

(54) VIBRATION STOP DEVICE

(71) Applicant: Matsuura Machinery Corporation, Fukui, Fukui (JP)

(72) Inventors: Koichi Amaya, Fukui (JP); Syuji Iizuka, Fukui (JP); Kiyotaka Iwai, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 206 days.

(21) Appl. No.: 15/088,907

(22) Filed: Apr. 1, 2016

(65) Prior Publication Data
US 2016/0214221 A1    Jul. 28, 2016

Related U.S. Application Data

(62) Division of application No. 14/616,236, filed on Feb. 6, 2015, now abandoned.

(30) Foreign Application Priority Data

May 19, 2014  (JP) .................................. 2014-103625

(51) Int. Cl.
B23Q 1/76      (2006.01)
B23Q 3/08      (2006.01)
(Continued)

(52) U.S. Cl.
CPC .................. B23Q 1/76 (2013.01); B23Q 3/08 (2013.01); B23Q 3/082 (2013.01); B25B 5/064 (2013.01); B25B 5/147 (2013.01)

(58) Field of Classification Search
CPC .. B23Q 1/76; B23Q 3/08; B25B 5/064; B25B 5/147
See application file for complete search history.

(56) References Cited

U.S. PATENT DOCUMENTS 2,104,117 A * 1/1938 Findlater ................. B21B 23/00
                                                            72/428
2,426,498 A * 8/1947 Franklin ................... B25B 5/08
                                                            248/509
(Continued)

FOREIGN PATENT DOCUMENTS

DE      3717091 A1 * 8/1988 ............... B23Q 1/76
DE      4125003 A1 * 1/1993 ........... B23Q 1/5406
(Continued)

Primary Examiner — Marc Carlson
(74) Attorney, Agent, or Firm — Richard M. Goldberg

(57) ABSTRACT

A method of stopping vibration of a columnar work during processing thereof, includes the steps of providing a cylindrical columnar work having an outer circumferential surface divided into a non-processed region and at least two recessed processed regions with a circumferential cross-section forming a perimeter including two spaced apart non-processed perimetric segments separated by two spaced apart processed perimetric segments, providing a vibration stop including only two holding parts having arc shaped surfaces, locating the columnar work between the arc shaped surfaces of the holding parts adjacent the perimeter with each processed region radially inward, orienting the columnar work such that each arc shaped surface contacts the outer circumferential surface at both spaced apart non-processed perimetric segments with one processed perimetric segment located therebetween, each arc shaped surface, and holding the columnar work with the holding parts to prevent vibration of the columnar work during processing of the columnar work.

5 Claims, 3 Drawing Sheets

(51) Int. Cl.
  *B25B 5/06* (2006.01)
  *B25B 5/14* (2006.01)

(56) References Cited

U.S. PATENT DOCUMENTS

| | | | | |
|---|---|---|---|---|
| 2,547,529 A * | 4/1951 | Lichtenberg | ............. | B23Q 1/76 451/408 |
| 2,558,252 A * | 6/1951 | Ifanger | ................ | B23B 31/1284 279/33 |
| 2,593,706 A * | 4/1952 | Von Zelewsky | .... | B23B 31/1284 192/105 CF |
| 2,612,809 A * | 10/1952 | Shager | ..................... | B23Q 1/76 82/164 |
| 2,686,444 A * | 8/1954 | Reichl | ..................... | B21B 25/02 72/11.5 |
| 2,693,365 A * | 11/1954 | Von Zelewsky | .... | B23B 31/1284 279/106 |
| 2,784,977 A * | 3/1957 | Dinsmore | ........... | B23B 31/1284 279/106 |
| 3,101,015 A * | 8/1963 | Schuetz | ................. | B21B 25/02 279/106 |
| 3,232,601 A * | 2/1966 | Long | ........................ | B23Q 3/08 269/20 |
| 3,315,595 A * | 4/1967 | Moehlenpah | ........... | B25B 5/006 100/214 |
| 3,727,772 A * | 4/1973 | Pauls | ........................ | B25B 1/18 269/25 |
| 4,403,663 A * | 9/1983 | Janssen | ................ | B23P 19/065 173/178 |
| 4,470,285 A * | 9/1984 | Cattaneo | ................ | B21B 39/06 72/209 |
| 4,519,279 A * | 5/1985 | Ruggeri | ................... | B23Q 1/76 294/116 |
| 4,628,779 A * | 12/1986 | Louis | ..................... | B23B 13/02 414/14 |
| 4,967,579 A * | 11/1990 | Haydo | .................... | B21B 25/02 72/428 |
| 5,282,403 A * | 2/1994 | Rouleau | ............. | B23B 31/1269 82/127 |
| 5,347,897 A * | 9/1994 | Rouleau | ............. | B23B 31/1269 82/127 |
| 5,668,328 A * | 9/1997 | Steber | .................. | B25B 21/005 73/862.23 |
| 5,740,702 A * | 4/1998 | Smith | ................. | B25B 13/5008 29/240 |
| 6,062,933 A * | 5/2000 | Kasukawa | ........... | C03B 23/217 269/156 |
| 6,237,445 B1 * | 5/2001 | Wesch, Jr. | .............. | B25B 5/147 81/57.18 |
| 6,439,087 B1 * | 8/2002 | Haas | .................... | B23B 31/1269 82/163 |
| 6,568,096 B1 * | 5/2003 | Svitkin | .................... | B23Q 1/76 33/501.02 |
| 6,672,185 B1 * | 1/2004 | Behnke | .................... | B23Q 1/76 82/162 |
| 2007/0214921 A1* | 9/2007 | Fechter | ................ | B25B 21/005 81/467 |
| 2010/0096793 A1* | 4/2010 | Falk | .................... | B23K 9/0286 269/287 |
| 2010/0327507 A1* | 12/2010 | Clark | ....................... | B25B 5/04 269/207 |
| 2015/0328748 A1* | 11/2015 | Amaya | .................... | B25B 5/064 269/30 |

FOREIGN PATENT DOCUMENTS

| | | | |
|---|---|---|---|
| DE | 102012217001 A1 | * | 3/2014 |
| JP | 10-175035 A | | 6/1998 |
| JP | 2003-275903 A | | 9/2003 |
| JP | 2005-169530 A | | 6/2005 |
| JP | 2010-99746 A | | 5/2010 |
| JP | 2010099746 A | * | 5/2010 |

* cited by examiner

PRIOR ART

VIBRATION STOP DEVICE

TECHNICAL FIELD

The present invention is relates to a vibration stop device necessary for stopping vibration of a work in a process stage.

BACKGROUND OF THE INVENTION

Accurate processing on a work in a process stage requires the work to be prevented from vibrating.

The work is divided into a processing region and a non-processing region along a circumferential direction, and in many cases, moves together with a main shaft in a state where a holding part for vibration stop is in pressure contact with an already processed region of the work.

As shown in FIG. 5, in the pressure contact state of the holding part of a prior art, a pressure contact region is too small. Thus, it cannot be avoided to make a partial region of the holding part come into pressure contact.

On the other hands, the pressure contact state causes a problem that the pressure contact region of the holding part intrudes into a region recessed by the processing, in the other words, in a recess, and even if the work is to be rotated along a columnar center axis for the next processing, such rotation is hindered due to the intrusion.

However, in the prior art, no particular countermeasure has been taken for the problem caused by the pressure contact region of the holding part intruding into the recesses that has been formed by the processing.

For reference, Patent Document 1 describes, regarding a camshaft work to be ground, a processing region and vibration stop for the work, nevertheless has no particular description on the relationship between the processing region and the vibration stop.

Patent Document 2 describes both processing on a work and a vibration stop device, but does not describe the problem arising when the pressure contact region comes into contact with the region that has already been processed.

PRIOR ART DOCUMENT

Patent Document

Patent Document 1: JP 2005-169530 A
Patent Document 2: JP 2010-99746 A

SUMMARY OF THE INVENTION

Problems to be Solved by the Invention

An object of the present invention is to provide a configuration of a vibration stop device that can prevent a problem caused by a pressure contact region of a holding part of the vibration stop device intruding into a recess of a region that has been processed.

Effect of the Invention

To achieve the object, the present invention has the following method:

(1) A method of stopping vibration of a columnar work during processing of the columnar work, the method comprising the steps of:

providing a columnar work with a radius of curvature and an outer circumferential surface divided into a non-processed region and at least two processed regions wherein the processed regions are modified to be recessed from the outer circumferential surface and positioned to provide a circumferential cross-section through the columnar work that forms a perimeter of the columnar work comprising two spaced apart non-processed perimetric segments separated by two spaced apart processed perimetric segments, providing a vibration stop device including only two holding parts, with each holding part having an arc shaped surface on a pressure contact side thereof, and with a radius of curvature of each arc shaped surface being the same as the radius of curvature of the non-processed region of the columnar work, locating the columnar work between the holding parts in a location of the circumferential cross-section in such a manner that the perimeter and the outer circumferential surface of the columnar work are adjacent to the arc shaped surfaces and each of the processed regions are located radially inward from the arc shaped surfaces, orienting the columnar work such that each of the arc shaped surfaces contact the outer circumferential surface at both the two spaced apart non-processed perimetric segments with one of the processed perimetric segments located between each of the arc shaped surfaces directly above but out of contact with the respective processed region located directly radially below, holding the columnar work with the holding parts to prevent vibration of the columnar work during processing of the columnar work, by pressure supplied from a hydraulic cylinder and through an oil pressure supply part, and changing a pressure contact position of the holding parts on the outer circumferential surface by releasing pressure of the holding parts thereon to permit rotation of the columnar work.

(2) A method according to structure (1), wherein the processing processed region extends for an angular range of the columnar work, and the step of holding includes the step of holding the outer circumferential surface of the columnar work with the holding parts in such a manner that the holding parts hold the columnar work in the non-processed region along an angular range around the columnar work which is larger than an angular range of the processed region which is formed in the recess of the columnar work.

In the present invention using the method of (1), (2), (3), (4) and (5), the pressure contact region of the holding part of the vibration stop device never introduces into the recess in the processing region, and so, the problem in the rotation of the work due to the intrusion can be prevented.

Moreover, in the examples described later, the position of the holding parts can be independently adjusted, whereby the precision error of the work can be easily corrected.

DETAILED DESCRIPTION

As described in the basic structure, the present invention has a feature that, regarding the angular range based on a position of an axis of rotation of a columnar work 2, an angular range formed by both ends of each of a holding part for vibration stop 11 is larger than an angular range of a processing region 21.

Figure 1:
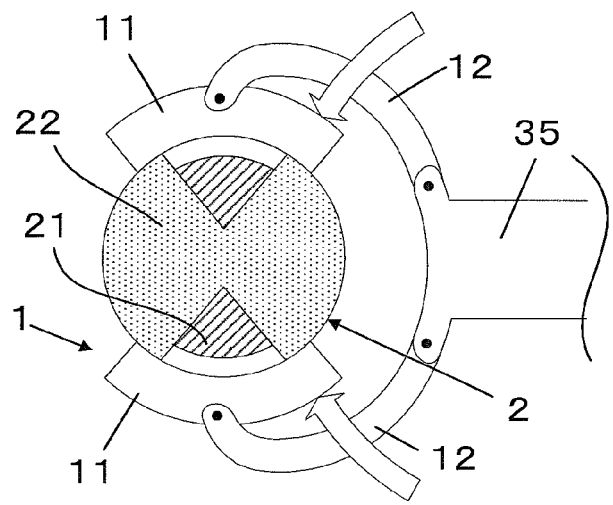
FIG. 1 is a side cross-sectional view of a first embodiment.
Figure 2:
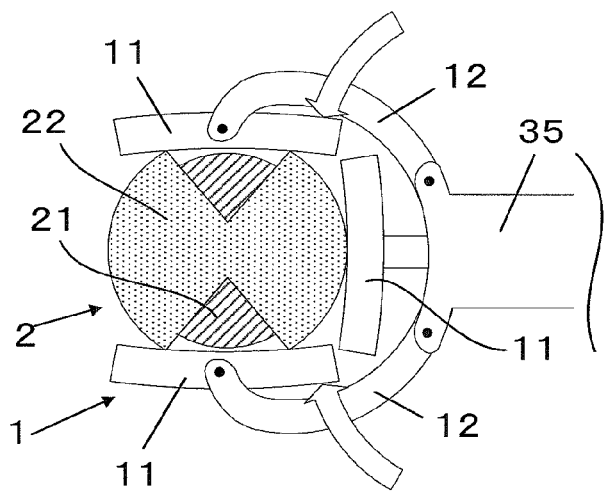
FIG. 2 is a side cross-sectional view of a second embodiment.
Figure 3:
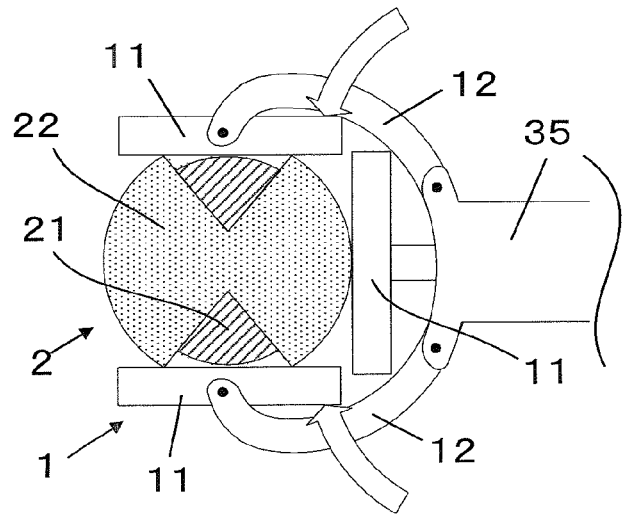
FIG. 3 is a side cross-sectional view of a third embodiment.

The basic structure can be embodied in a number of ways. FIGS. 1 to 3 show typical embodiments.

FIG. 1 shows the first embodiment having a feature that a holding part has an arc shaped surface on the pressure contact side, and a radius of curvature of the arc is the same as the radius of the work 2.

In the first embodiment, pressure contact can be done mainly at a non-processing region 22.

Of course a holding part for vibration stop 11 never intrudes into a recess of the processing region 21 that has already been processed.

FIG. 2 shows the second embodiment having a feature that the holding part for vibration stop 11 has an arc shaped surface on the pressure contact side, and a radius of curvature of the arc is larger than the radius of the work 2.

FIG. 3 shows the third embodiment having a feature that the holding part for vibration stop 11 has a flat surface on the pressure contact side.

In the second and third embodiments, the surface of the holding part for vibration stop 11 on the pressure contact side might come into contact with or come close to a surface of the processing region 21, as shown in FIGS. 2 and 3. However, also in these embodiments, as shown in FIGS. 2 and 3, the holding part for vibration stop 11 never intrudes into the recess of the processing region 21 as in the first embodiment. This is because the angular range formed by both ends of each of the holding part for vibration stop 11 is formed to be larger than an angular range of the processing region 21.

As shown in FIGS. 1 to 3, in each of the first, second, and third embodiments, a pair of the holding parts for vibration stop 11 comes into pressure contact with both sides of the work 2, and the two sides of the work 2 are rotatably connected to the pair of the holding parts for vibration stop 11, and a pressure transmission part 12 which is interlocked with a single hydraulic cylinder 31 is provided, such that approaching and separating of the holding parts for vibration stop 11 to and from the work 2 are achieved by changing oil pressure.

In the first embodiment, even when the entire processing region 21 is formed into the recess as shown in FIG. 1, the holding parts for vibration stop 11 are in pressure contact with both sides of the non-processing regions 22 and at least four pressure contact regions are formed. Thus, unlike the conventional technique shown in FIG. 5, the holding part for vibration stop 11 for directly transmitting the oil pressure from the hydraulic cylinder 31 is not required to be provided in addition to the holding parts for vibration stop 11 for sandwiching the work 2 from both sides.

However, in the second and third embodiments, as shown in FIGS. 2 and 3, the holding parts for vibration stop 11 are not necessarily in pressure contact with both sides of the non-processing regions 22. When the depth of the recess of the processing region 21 is very small, the pressure contact is made on two positions of the processing regions 21, and so the pressure contact state is achieved at substantially two points. Thus, as shown in FIGS. 2 and 3, the third holding part for vibration stop 11 that directly presses and comes into pressure contact with the work 2 by the pressure from the hydraulic cylinder 31 may be provided.

The first embodiment does not require the third holding part for vibration stop 11, and thus can achieve a simpler design and lower cost compared with the second and third embodiment.

However, the first embodiment requires the holding parts for vibration stop 11 having radii of curvature respectively corresponding to the various radii of the works 2, and thus is more cumbersome than the second and third embodiment in this point.

Examples are described as follows:

EXAMPLES

Example 1

Figure 4:
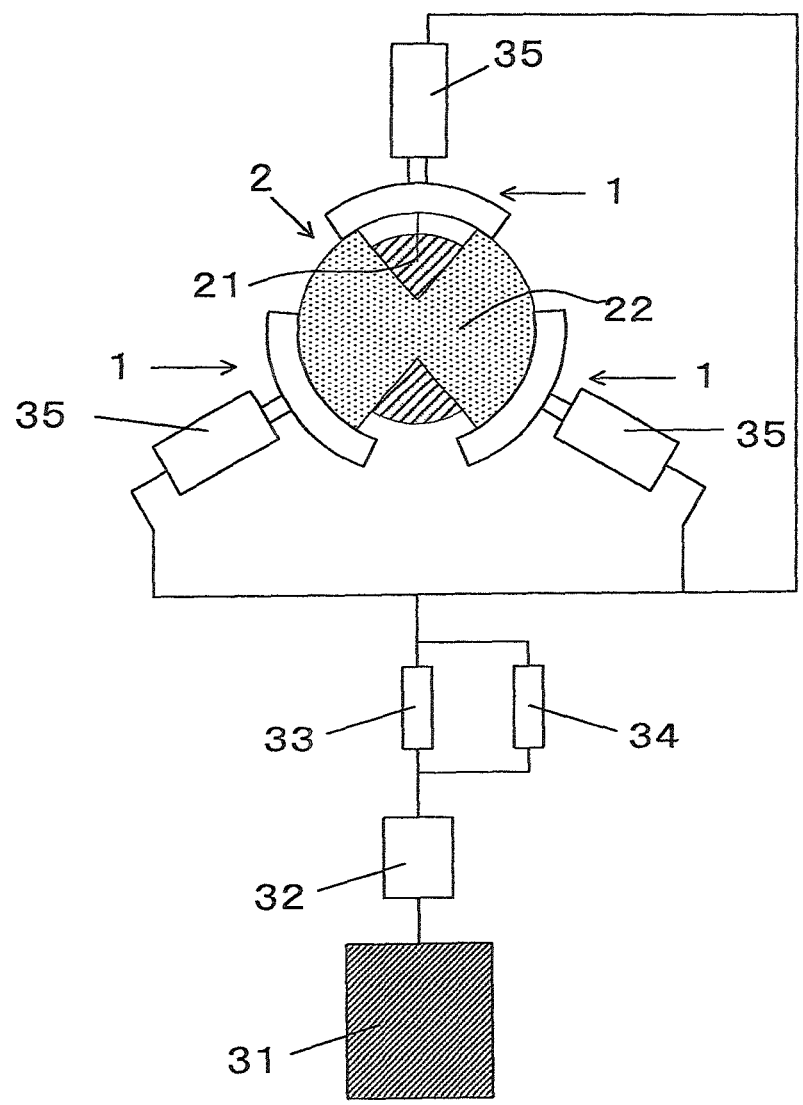
FIG. 4 is a side cross-sectional view of a vibration stop, device of the invention, and also includes a block diagram showing a configuration of an oil pressure supplying device.

As shown in FIG. 4, the example 1 has a feature that the holding parts for vibration stop 11 are each independently interlocked with a hydraulic cylinder 31, and approaching and separating of the holding parts for vibration stop 11 to and from the work 2 are achieved by changing the oil pressure.

When a precision error occurs in the work 2, the pressure contact state created by a vibration stop device needs to be immediately released, and the processing region 21 where the precision error has occurred needs to be rotated to an operation position on a main shaft side.

Figure 5:
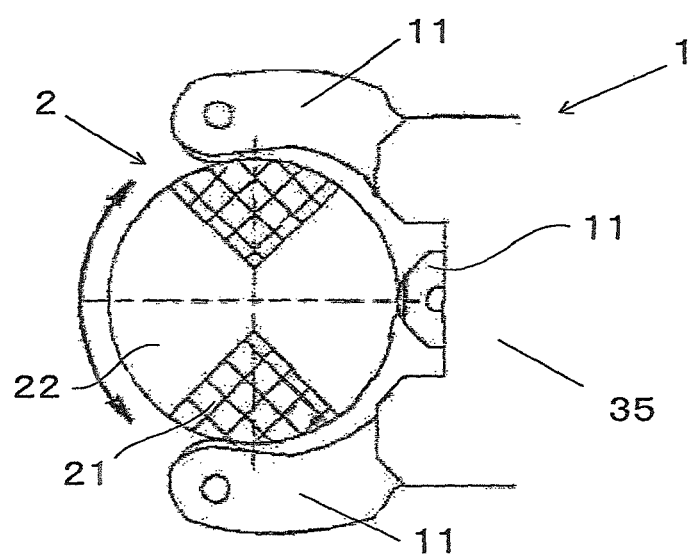
FIG. 5 is a side cross-sectional view of a configuration of a vibration stop device of the prior art.

In such a case, the conventional technique shown in FIG. 5 and the embodiments shown in FIGS. 1 to 3 require cumbersome operation control such as an operation of the pressure transmission part 12, and movement of the third holding part for vibration stop 11.

In the example 1, the rotation state can be achieved by immediately releasing, from each of the holding parts for vibration stop 11, pressure supplied from the hydraulic cylinder 31, and the precision error can be quickly corrected.

In many cases, a number of the holding parts for vibration stop 11 and a number of the hydraulic cylinders 31 shown in the example 1 are each three.

Example 2

As shown in FIG. 4, the example 2 has a feature that a relief valve 34 is provided in juxtaposition with the solenoid valve 33 which supplies the oil pressure to the vibration stop device, in a hydraulic circuit that creates the pressure contact state.

Specifically, a hydraulic cylinder 31, a pressure reducing valve 32 for adjusting the pressure, and the solenoid valve 33 for turning ON and OFF transmission of reduced pressure are used as in the conventional technique, and the relief valve 34 in parallel with an oil pressure circuit is further provided.

In the example 2 described above, even if the vibrating state of the work 2 is changed and consequently the amount of pressure required for the pressure contact of the holding part for vibration stop 11 changes by turning ON the relief valve 34, the change in the pressure can be compensated by the relief valve turning on, so that the pressure transmitted to the hydraulic cylinder 31 can be reduced as much as possible.

APPLICABILITY OF THE INVENTION

Thus, the present invention can achieve the vibration stop without the problem of intrusion into the recess of the processing region, and can quickly correct the precision error, and thus is extremely useful.

EXPLANATION OF REFERENCE NUMERALS 1 vibration stop device
11 holding part for vibration stop
12 pressure transmission part
2 work
21 processing region
22 non-processing region
3 oil pressure transmission device
31 hydraulic cylinder
32 pressure reducing valve
33 solenoid valve
34 relief valve
35 oil pressure supply part

What is claimed is:

1. A method of stopping vibration of a columnar work during processing of the columnar work, the method comprising the steps of:
    providing a columnar work with a radius of curvature and an outer circumferential surface divided into a non-processed region and at least two processed regions wherein the processed regions are modified to be recessed from the outer circumferential surface and positioned to provide a circumferential cross-section through the columnar work that forms a perimeter of the columnar work comprising two spaced apart non-processed perimetric segments separated by two spaced apart processed perimetric segments,
    providing a vibration stop device including only two holding parts, with each holding part having an arc shaped surface on a pressure contact side thereof, and with a radius of curvature of each arc shaped surface being the same as the radius of curvature of the non-processed region of the columnar work,
    locating the columnar work between the holding parts in a location of the circumferential cross-section in such a manner that the perimeter and the outer circumferential surface of the columnar work are adjacent to the arc shaped surfaces and each of the processed regions are located radially inward from the arc shaped surfaces,
    orienting the columnar work such that each of the arc shaped surfaces contact the outer circumferential surface at both the two spaced apart non-processed perimetric segments with one of the processed perimetric segments located therebetween, each of the arc shaped surfaces directly above but out of contact with the respective processed region located directly radially below,
    holding the columnar work with the holding parts to prevent vibration of the columnar work during processing of the columnar work, by pressure supplied from a hydraulic cylinder and through an oil pressure supply part, and
    changing a pressure contact position of the holding parts on the outer circumferential surface by releasing pressure of the holding parts thereon to permit rotation of the columnar work.

2. A method according to claim 1, wherein the processed region extends for an angular range of the columnar work, and the step of holding includes the step of holding the outer circumferential surface of the columnar work with the holding parts in such a manner that each of the arc shaped surfaces are in contact with the two spaced apart non-processed perimetric segments along an angular range around the columnar work which is larger than an angular range around the columnar work of the respective processed perimetric segment which is recessed from the outer circumferential surface and between the two spaced apart non-processed perimetric segments.

3. A method according to claim 1, wherein said step of providing includes the step of providing first and second diametrically opposite said holding parts which come into pressure contact with opposite sides of the columnar work, and further comprising the step of providing a pressure transmission part which is interlocked with the hydraulic cylinder for approaching and separating of the holding parts for the vibration stop device to and from the work by changing oil pressure.

4. A method according to claim 1, further comprising the step of independently interlocking the holding parts for the vibration stop device with the hydraulic cylinder for approaching and separating of the holding parts for the vibration stop device to and from the columnar work by changing oil pressure.

5. A method according to claim 1, further comprising a hydraulic circuit for supplying oil pressure to the vibration stop device and which includes a relief valve in juxtaposition with a solenoid valve.

* * * * *